United States Patent [19]

Roth et al.

[11] Patent Number: 4,555,426
[45] Date of Patent: Nov. 26, 1985

[54] PREFORMED, LAMINATED PLASTIC PANELS

[75] Inventors: Siegfried Roth, Salem; Horst Stenzenberger, Schriesheim, both of Fed. Rep. of Germany

[73] Assignees: Dornier GmbH, Friedrichshafen; Technochemie GmbH-Verfahrenstechnik, Dossenheim, both of Fed. Rep. of Germany

[21] Appl. No.: 543,365

[22] Filed: Oct. 19, 1983

[30] Foreign Application Priority Data

Nov. 20, 1982 [DE] Fed. Rep. of Germany ....... 3243021

[51] Int. Cl.$^4$ ............................................. B32B 5/12
[52] U.S. Cl. ................................... 428/113; 428/910
[58] Field of Search ............................. 428/113, 910

[56] References Cited

U.S. PATENT DOCUMENTS 3,578,544  5/1971  Thorsrud ........................ 428/113
4,119,748  10/1978  Verbauwhede et al. ........... 428/113
4,379,798  4/1983  Palmer et al. .................... 428/113

*Primary Examiner*—Edith Buffalow
*Attorney, Agent, or Firm*—Hammond & Littell, Weissenberger & Dippert

[57] ABSTRACT

Novel preformed, laminated plastic panels as semi-finished products comprising a plurality of individual laminated thermoplastic layers or thermoplastic layers arranged in partly differing orientations reinforced with unidirectionally preoriented short fibers comprising 20 to 80% of the layer volume, said laminate capable of being molded and/or deep drawn by hot pressing and/or hot molding at 70° to 400° C. and at a pressure of approximately 40 bar.

3 Claims, 1 Drawing Figure

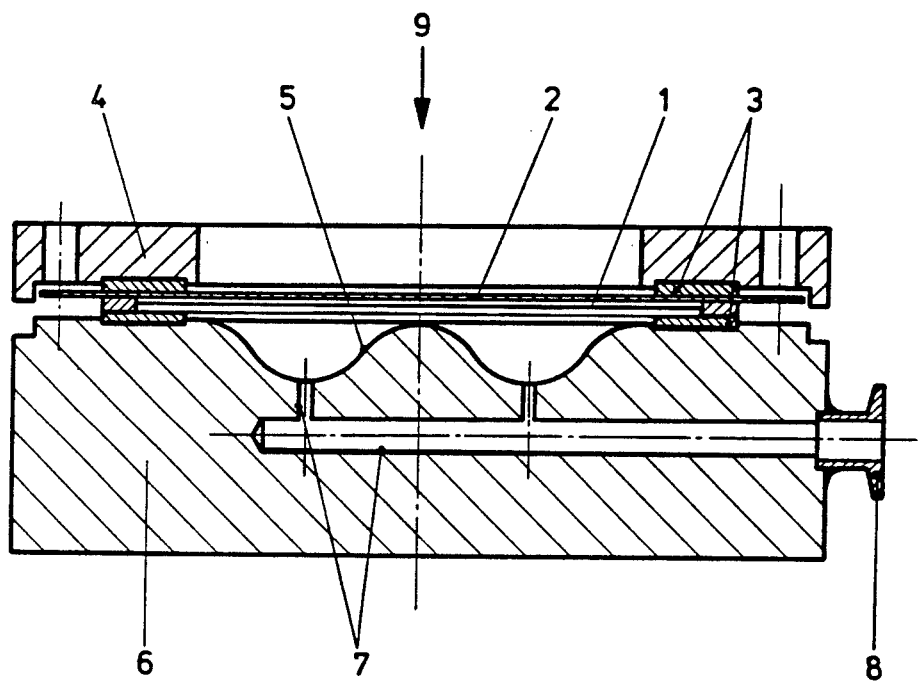

PREFORMED, LAMINATED PLASTIC PANELS

STATE OF THE ART

It is known that very strong and thermally resistant laminates may be prepared by dissolving temperature resistant polymers or resins in a solvent and using the said solution to impregnate fleece, textiles or woven goods of fibers such as carbon filaments, glass fibers, boron fibers or organic high-molecular weight polyamide fibers (aramides) and then evaporating the solvent. The resulting preimpregnated fiber material called a prepreg can then be formed into a temperature resistant fiber laminate under pressure at high temperatures.

Examples of suitable impregnating resins are thermosetting resins such as polyesters, epoxide resins, cyanates, isocyanates and imides and thermoplastic polymers such as polysulfones, polyhydantoin, polycarbonate, polyamide, polyamideimide, polyester, polyesterimide, polymide, polyphenylquinoxaline, polybenzimidazole or polybenzoxazole, for example. The intermediate or prepreg products may be produced either by the solvent process described above in which case the matrix resin must be soluble in conventional, suitable organic solvents to form an impregnating lacquer, or by the use of a solvent-free resin melt.

Prepregs of textiles, unidirectional mats, etc. can be processed by press-mold methods for the manufacture of planar, level laminates or by low-pressure autoclave methods. Spherically curved planar laminates can be produced practically only by low-pressure autoclave methods, preferably with the use of thermosetting resins with good flow characteristics and numerous methods of this type are known. For example in German Pat. No. 12 033, large-area, preferably spherical molded parts of a fibrous filler with synthetic resin as binder are produced by stacking several layers of a fiber fleece, sprinkling synthetic resin powder, especially mixed resins of cresol, phenol, or phenol-cresol, caoutchouc-modified synthetic resins, epoxy resins, polyester resins or other thermosetting or thermoplastic resins between the layers and shaping the layered intermediates product in a heated press mold by extrusion and/or hardening and compressing it into the finished molded article.

In another process for the preparation of laminated foil material from a fibrous support foil and a layer of sintered plastic material with small pores lying above it that has a uniform layer of a granular, thermoplastic resin distributed on the support foil which is heated together with the support foil and in which a cover layer is applied to the resin layer during the treatment is known from the German Offenlegungsschrift No. 12 90 708. The cover layer consists of an elastic, compressible fibrous material and is applied to the granular resin layer before heating. In this process, the structure consisting of the support foil, the resin granules and the cover layer is fed in a well-known manner between heated plates which have a space between them that corresponds approximately to the thickness of the laminated material at the entrance port and decreases considerably toward the exit port.

Another process for the preparation of formed parts made of fiber glass reinforced thermoplastics is known from German Offenlegungsschrift No. 22 28 922 and is characterized by the preparation of thin-walled, pressed or deep-drawn formed parts as well as by injection-molded parts or by pressing with walls of varying thicknesses from the same thin-walled, planar premolded material.

Finally there is a process described in German Offenlegungsschrift No. 26 47 821 for the preparation of fiber-reinforced polyolefins with a high proportion of fiber volume in which a polyolefin matrix material is first dissolved in a solvent, the fiber structure is soaked in this solution, the solvent is subsequently driven off and then the matrix material is again compressed by heating above its melting point. Disadvantages of this process are the long molding times required because of the reactivity and usually also high temperatures for hardening, which affect the production costs of the products unfavorably and include the molding time as a significant factor. Another disadvantage is the low level of obtainable strength and rigidity of the material in articles molded of thermoplastic synthetic resins filled with short fibers, which is due to irregular fiber orientation and low fiber content. Because of the irregular fiber orientation and the flow characteristics of the resin, the fiber content cannot be increased at will.

OBJECTS OF THE INVENTION

It is an object of the invention to provide a preformed laminated plastic panel as a semi-finished product analogous to sheet metal.

It is another object of the invention to provide very strong and rigid building elements of complex shapes and an economical process and apparatus for forming the same.

These and other objects and advantages of the invention will become obvious from the following detailed description.

THE INVENTION

The novel preformed, laminated plastic panels of the invention are comprised of a plurality of individual laminated thermoplastic layers or thermoplastic layers arranged in partly differing orientations reinforced with unidirectionally preoriented short fibers comprising 20 to 80% of the layer volume.

Examples of suitable thermoplastic resins for the matrix are resins of a medium molecular weight based on polysulfones, polyamides, polycarbonates, polyhydantoins, polyester imides, polyimides, polyphenylquinoxalines, polybenzimidazoles, polybenzoxazoles and polyesters. Examples of suitable fibers are carbon filaments, glass fibers, boron fibers, ceramic fibers, metal fiber and synthetic fibers such as polyamide fibers measuring 0.1 to 1.0 cm long, preferably about 0.6 cm.

The fiber mats making up the laminate panels may be prepared by impregnating a fiber mat of unidirectionally oriented short fibers with a solution of a thermoplastic resin and evaporating the solvent resulting in a mat impregnated with resin. Pieces of the said mats can be stacked or layered with differing fiber orientation, heated in a panel press under pressure above the melting point of the thermoplastic resin for a short period of time and cooling the resulting panel below the glass transition temperature of the thermoplastic resin and removing the panel from the press.

Another method of forming the panels or "organic sheet metals" when the thermoplastic resin is insoluble in suitable organic solvents is the so-called film-stacking method wherein oriented short fiber mats or foils of the thermoplastic resins are alternatively stacked in a vacuum temperature of the thermoplastic resin under vacuum and pressure, cooling the stack under pressure and vacuum below the glass transition temperature of the resin and removing the same from the mold.

The process of the invention for the formation of very strong, rigid building elements of complex geometry comprises forming a semi-finished panel of the invention and subjecting the same to a hot pressing and/or hot molding process 70° C. to 400° C. and a pressure of 1 to 120 bar for a short time during which the panel is pressed against a contoured surface, and cooling and removing the shaped panel from the apparatus. The process is economically advantageous because of its short molding times and the excellent strength and rigidity due to the oriented short fibers and the high fiber content.

For the deep drawing of the panels or "organic sheet metal" produced by this method, a resin content of 20 to 80%, preferably between 35 to 70%, most preferably 40 to 65%, by volume is obtained by using an accordingly concentrated solution of the resin for the impregnation of the panels or mats. The directions in which the fibers in the individual layers of the panels or mats are oriented are largely determined by the strengths desired in a building component and the number of individual fiber layers in the "organic sheet metal" can be multiplied almost at will.

The apparatus of the invention is comprised of a mold provided with a contoured surface provided with a holding means to hold a panel to be molded just above the said surface, means for applying pressure on the panel towards the contoured surface and means to apply a vacuum on the space between the panel and the contoured surface.

REFERRING NOW TO THE DRAWING

The FIGURE illustrates an apparatus for warm pressure deep-drawing of the panels of the invention.

In the apparatus, the panel 1 of the invention is clamped together with a vacuum tight rubber cover 2 which acts as a pressure stamp and top and bottom sealing rings 3 with tension ring 4 onto molding tool 6 provided with contour surface 5. The molding tool 6 is provided with channels 7 having a vacuum connection 8 for evacuation of the space above contour surface 5. Pressure 9 is applied from above onto the tension ring 4 and the panel 1.

In the following examples there are described several preferred embodiments to illustrate the invention. However, it should be understood that the invention is not intended to be limited to the specific embodiments.

EXAMPLE 1

A 5% solution of a polysulfone (Makrolon KL 3-1006) in methylene chloride was used to impregnate a mat of oriented carbon filaments 3 to 5 cm in length which was laid flat on glass surface while the solution was homogenously spread thereon. The mat was then dried at 70° C. in a drying oven and was removed from the glass plate. The resulting "prepreg" had a resin content of 45% by weight.

EXAMPLE 2

Undirectional short fiber mats as used in Example 1 were impregnated with a solution of a polyether sulfone with a glass transition temperature of 210° C. in methylene chloride by applying the solution uniformly to the said mats on a glass surface and the mats were dried as in Example 1. The resulting "prepreg" were cut into 15 cm × 15 cm squares and the said squares were symmetrically stacked with an orientation of 0, +45, −45 and −90 angular degrees. The stacked squares were placed in a heated panel press at 250° C. to 300° C. under pressure to form a dense, plane laminate. Due to the glass transition temperature of 210° C. for the thermoplastic resin, the laminate was cooled under pressure to a temperature considerably below 210° C., preferably 120° C., and the laminate was then removed from the mold. The resulting "organic sheet metal" could be shaped under pressure into building elements of complex geometry.

EXAMPLE 3

Unidirectional, non-compacted "prepregs" of Example 1 were cut in to 15 cm × 15 cm aqueous and were symmetrically stacked with an orientation of 90, 0, 0, 90 angular degrees. The stacked squares were placed with contact pressure between aluminum foils in a panel press preheated to 330° C. and after adequate heating of the prepreg stack under pressure, the press was closed. The stack was subjected to a pressure of 40 Kp/cm² for 5 minutes and the material was cooled to 100° C. under pressure. The resulting dense panel when removed from the press was 0.75 mm thick and had a mass per unit area of $1000 \pm 70$ g/m².

Using the apparatus of the FIGURE, the said panel was subjected to warm pressure deep drawing. The panel and the molding tool were both heated to about 220° C. in an auto clave and the panel was molded by a vacuum against the contour surface with a pressure of about 100 N/cm².

Various modifications of the products and processes of the invention may be made without departing from the spirit or scope thereof and it should be understood that the invention is intended to be limited only as defined in the appended claims.

What we claim is:

1. A preformed, rigid, laminated plastic panel comprising a plurality of individual rigid, unfoamed, non-porous laminated thermoplastic layers or thermoplastic layers arranged in partly differing orientation reinforced with unidirectionally preoriented short fibers comprising 20 to 80% of the layer volume.

2. The panel of claim 1 wherein the short fibers are selected from the group consisting of carbon fibers, glass fibers, ceramic fibers, metal fibers, polymeric fibers and mixtures thereof.

3. The panel of claim 1 wherein the layers have a fiber volume of 40 to 65%.

* * * * *

UNITED STATES PATENT AND TRADEMARK OFFICE
CERTIFICATE OF CORRECTION

PATENT NO. : 4,555,426
DATED : Nov. 26, 1985
INVENTOR(S) : SIEGFRIED ROTH ET AL.

It is certified that error appears in the above-identified patent and that said Letters Patent is hereby corrected as shown below:

Column 1, line 53: "Offenlegungsschrift" should read -- Auslegeschrift --.

Column 2, line 67: "vacuum temperature" should read -- vacuum bag, the resulting stack is slowly heated to the melting temperature --.

Column 3, line 55: "on glass" should read -- on a glass --.

Signed and Sealed this

Eighth Day of April 1986

[SEAL]

Attest:

DONALD J. QUIGG

Attesting Officer  Commissioner of Patents and Trademarks